United States Patent [19]

DeCesare

[11] Patent Number: 4,942,323
[45] Date of Patent: Jul. 17, 1990

[54] TWO POLE ELECTRIC MOTOR WITH STATOR WINDING ENCIRCLING THE ROTOR

[76] Inventor: Dominic DeCesare, 223 Center St., Elizabeth, N.J. 07202

[21] Appl. No.: 890,134

[22] Filed: Jul. 28, 1986

[51] Int. Cl.$^5$ ............................................. H02K 3/28
[52] U.S. Cl. .................................... 310/208; 310/172; 310/179; 310/216; 310/254; 318/750
[58] Field of Search .............. 310/172, 179, 216, 180, 310/184, 42, 40 MM, 211, 256, 166, 218, 254, 208, 194, 261, 162; 318/688, 750

[56] References Cited

U.S. PATENT DOCUMENTS

| 2,010,869 | 8/1935 | Lilja | 318/750 |
|---|---|---|---|
| 2,027,846 | 1/1936 | Suits | 318/750 |
| 2,066,760 | 1/1937 | Blamberg | 318/750 |
| 2,253,524 | 8/1941 | Lilja | 318/750 |
| 2,258,575 | 10/1941 | MacKay | 318/750 |
| 2,425,998 | 8/1947 | Crise | 318/750 |
| 2,487,688 | 11/1949 | Bishofberger | 310/172 |
| 2,488,771 | 11/1949 | Glass | 318/692 |
| 2,550,663 | 5/1951 | Bechberger | 310/208 |
| 2,567,976 | 9/1951 | Spinasse | 310/172 |
| 2,810,846 | 10/1957 | Hammerstrom | 310/172 |
| 4,156,821 | 5/1979 | Kurome | 310/172 |
| 4,482,832 | 11/1984 | Minton | 310/172 |
| 4,488,075 | 12/1984 | DeCesare | 310/208 |

FOREIGN PATENT DOCUMENTS

| 0275979 | 12/1966 | Australia | 310/42 |
|---|---|---|---|
| 847308 | 6/1952 | Fed. Rep. of Germany | 310/172 |
| 939950 | 10/1963 | United Kingdom | 318/750 |

Primary Examiner—R. Skudy
Attorney, Agent, or Firm—Myron Greenspan

[57] ABSTRACT

A two pole electric motor is described which includes at least one stator encircling winding which at least partially overlaps the rotor air gap to insure that substantially the entire magnetic field created by such rotor encircling winding is forced to pass through the rotor with minimal leakage or fringe magnetic field bypassing the rotor.

22 Claims, 5 Drawing Sheets

TWO POLE ELECTRIC MOTOR WITH STATOR WINDING ENCIRCLING THE ROTOR

BACKGROUND OF THE INVENTION

1. Field of the Invention

This invention generally relates to electric motors, and more specifically to a motor construction wherein the stator coils are arranged to maximize the flux coupled into the rotor space or air gap and, therefore, the rotor.

2. Description of Related Art

The operation of a motor relies upon effective coupling of magnetic flux or field developed in the stator poles into the rotor air gap or space and, therefore, the rotor. However, in most electrical machines there is considerable fringe or leakage flux which bypasses the rotor space, and, therefore, is not coupled to the rotor because magnetic flux takes the path of least resistance in the magnetic circuit, or the path of lowest magnetic reluctance. Since the opposing poles in a two pole motor are in the shape of circular cylindrical surfaces, to accommodate the cylindrical rotor, the extreme portions of the opposing poles, which are the closest to each other, offer the path of least resistance to the magnetic flux and a significant portion of that flux bridges such portions of the opposing poles and, thereby, bypasses the rotor. This fringe or leakage flux serves no useful purpose and prevents the motor from achieving optimum operational or performance characteristics.

In U.S. Pat. No. 4,482,832, issued on Nov. 13, 1984, a shaded pole motor is disclosed which uses a lamination design which improves the geometry of the inter-pole gap. According to the patentee, this is intended to improve the operating efficiency of the motor. This is achieved in the patent by providing a reluctance gap having a base region of minimal cross-sectional area. This design recognizes the problem created by fringe or leakage flux. Since fabrication of the laminations is substantially simplified by providing a single continuous lamination which forms both opposing poles, the reduction of the cross-sectional area to the minimum possible dimension increases the magnetic reluctance of the smaller sections of magnetic material, this forcing a greater amount of the flux through the rotor air gap or space. The situation resembles an electrical circuit of parallel resistors. The rotor space or gap between the poles represents a reluctance to the magnetic field which is substantially greater than the reluctance presented by the magnetic material forming the laminations. By decreasing the amount of metal bridging or connecting the poles, the reluctance to the magnetic field continues to increase thereby forcing a greater and greater amount of the flux through the air gap or rotor space.

The foregoing U.S. Pat. No. 4,482,832 discloses a very common type of fractional horsepower AC shaded pole electric motor construction. In this type of motor, there is provided a stator core which is basically U-shaped, including two side portions or arms and a connecting or cross portion provided with the cylindrical opening for the rotor. The end portions of the arms are bridged by a yoke which supports the coil. Application of an AC signal to the coil in such a motor causes a magnetic intensity in the magnetic circuit with the resulting flux splitting into two components as aforementioned. The exent to which the flux will pass through the rotor space will be a function of the thickness of the magnetic material connecting or bridging the opposing pole faces. However, even if the metal were theoretically entirely removed, so that there was true physical separation of the opposing poles, there would still be a significant amount of leakage or flux because the regions where the opposing poles are the closest are at these diametrically opposite sides of the rotor and this, again, presents the lowest reluctance path or path of least resistance for the flux.

There have been numerous proposals for positioning stator coils on motors. One example of such motor is disclosed in U.S. Pat. No. 2,253,524. This patent discloses a reversible motor including a primary stator coil positioned on the yoke as discussed in connection with U.S. Pat. No. 4,482,832. However, additional stator coils are provided on or in the region of the cross or bridging portion of the stator core and positioned on opposing sides of the rotor air gap or space. These coils are connected in different electrical configurations designed to permit easy reversal of the direction or rotation of the motor. In essence, the reference discloses the creation of multiple poles spaced from each other with respect to the axial or medial plane of the rotor to permit the enhancement of flux in different portions of the rotor. However, the motor disclosed in U.S. Pat. No. 2,253,524 suffers the same disadvantages above discussed since substantial amounts of flux field are bypassed or shunted around the motor and, therefore, serve no effective or useful function. Additional examples of reversible-type shaded pole motors are disclosed in the following U.S. Pat. Nos.: 2,027,846; 2,066,760; and 2,567,976.

SUMMARY OF THE INVENTION

An electric motor in accordance with the present invention includes a rotor with surface counductors and a stator which includes a stator core having spaced opposing poles which generally define an air gap therebetween for receiving the rotor rotatably mounted on the stator. Magnetic circuit means are provided connected to said poles for providing a low reluctance return magnetic circuit both for the effective magnetic field crossing said air gap and passing through said rotor as well as the fringe or leakage field which bypasses said rotor. At least one rotor encircling winding at least partially overlaps said air gap and at least partially receives a portion of said rotor. In this manner, substantially the entire magnetic field created by said at least one rotor encircling winding is forced to pass through said rotor with minimal leakage or fringe magnetic field bypassing said rotor. This construction optimizes the effectiveness of said at least one air gap and the performance characteristics of the motor.

In accordance with one presently preferred embodiment, a shaded pole motor is provided with two separate rotor encircling windings, with or without a conventional yoke winding, the windings encircling the rotor being disposed on opposite sides of the rotor shaft. According to another embodiment, a single rotor encircling coil is provided which bridges both sides of the rotor shaft. Preferably the rotor encircling coils are wound on rigid forms which are mounted on the stator core in a manner which does not interfere with the free rotation of the rotor. Additionally, in a construction wherein the conventional windings are placed on the opposing poles, a rotor encircling or auxiliary coil is provided on a rectangular form which receives the rotor and which is itself disposed between the two opposing poles.

In each embodiment of the present invention, the rotor encircling coils arranged over the rotor space create a magnetic field which is directed through the rotor space and, therefore, through the rotor itself so that the amount of leakage or fringe magnetic field which bypasses the rotor is minimized or totally eliminated. Since this construction optimizes the coupling of the flux to the rotor and, therefore, enhances the operating characteristics of the motor.

BRIEF DESCRIPTION OF THE DRAWINGS

The invention will now be described in further detail with regard to preferred embodiments as illustrated in the accompanying drawings, in which.

DESCRIPTION OF THE PREFERRED EMBODIMENTS

Figure 1:
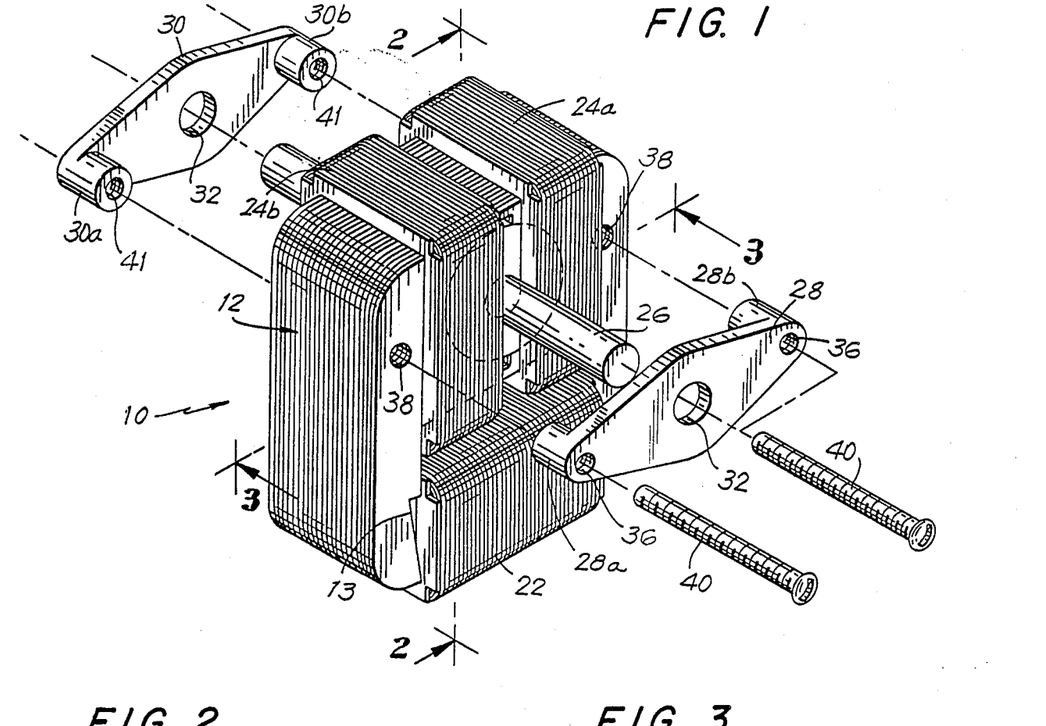
FIG. 1 is an exploded view in perspective of one presently preferred embodiment of the invention, as showing a two pole AC shaded pole motor with one conventional, primary or yoke winding and two secondary or auxiliary rotor encircling coil windings over the rotor space; one on each side of the rotor shaft.
Figure 2:
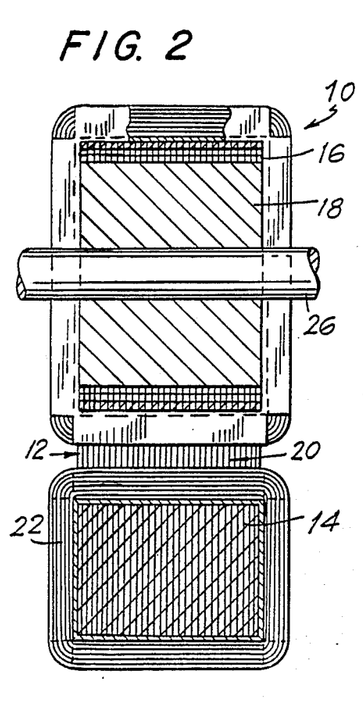
FIG. 2 is an enlarged cross-sectional view of the motor shown in FIG. 1, taken along line 2—2.
Figure 3:
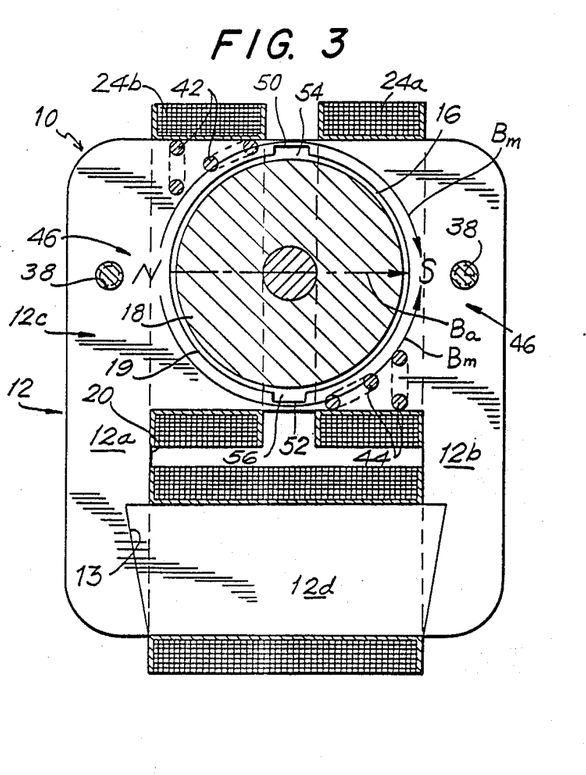
FIG. 3 is an enlarged cross-sectional view of the motor as show in FIG. 1, taken along line 3—3.

Referring now specifically to the figures, in which identical or similar parts are designated by the same reference numeral throughout, and first referring to FIGS. 1-3, there is illustrated a first embodiment of fractional horse power AC shaded pole electric motor generally designated by the reference numeral 10.

The basic construction of the motor 10 is similar to the shaded pole motor disclosed in U.S. Pat. No. 4,482,832. One motor of this type is manufactured, for example, by the Gould, Inc. under style "Type TP", Model No. 101-2179.

The motor 10 includes a stator core 12 formed of a series of stacked laminations 14 having the same geometry and made of a magnetically permeable material of the type well known to those skilled in the art. The laminations are generally rectangular in configuration and include a generally U-shaped member consisting of two lateral or side portions or arms 12a, 12b connected by a bridging or cross portion 12c. At their free ends, the arms 12a, 12b are joined by a yoke 12d in any conventional manner, such as being press-fitted by the use of a dove tail configuration at cutting lines 13 in FIG. 3.

The bridging or cross portion 12c of the stator core 12 is provided with a circular cylindrical opening or rotor space 16, the axis of which is normal to the planes of the laminations 14 for receiving therein a rotor 18, such as a squirrel cage rotor, with a small clearance or air gap 19. The cylindrical opening 16, therefore, forms a rotor air gap or space in which the rotor 18 is conventionally mounted for rotation. The laminations are also provided with cut outs which produce a generally rectangular opening 20 which accommodates at least a portion of the primary or yoke winding 22 mounted on the yoke 12d. As suggested above, the winding 22 corresponds to the conventional windings commonly used on two pole AC shaded pole motors. In the conventional motor, however, the yoke winding 22 is generally provided with a greater number of turns than shown in FIGS. 1-3 and the yoke winding 22 consumes or fills practically the entire rectangular space 20.

An important feature of the present invention is the use of secondary or auxiliary stator rotor encircling coil or windings 24a, 24b which at least partially overlap the cylindrical opening 16 and, therefore, at least partially encircles or receives a portion of the rotor 18. In the embodiment under discussion, two such auxiliary coils 24a, 24b are used, one on each side of the shaft 26 of the rotor 18.

In a typical construction, the rotor is fixed in position by conventional-type front and rear retainers 28, 30 each of which is provided with holes 36 aligned with holes 38 in the stator core 12 so that bolts 40 can pass through the holes 36 in the front retainer 28 and through the holes 38 in the stator core 12 to be received within threaded holes 41 in the rear retainer 30. Each of the retainers 28, 30 is provided with spacing portions 28a, 28b and 30a, 30b, respectively, to insure that the retainers clear the windings of the auxiliary coils 24a, 24b. Other methods for securing the rotor to the stator, known to those skilled in the art, may also be used.

Referring to FIG. 3, the motor 10 is shown provided with conventional shading coils 42, 44 mounted on the laminations 14 before the auxiliary coils 24a, 24b are mounted.

The cylindrical opening 16 defines two opposing poles which, in FIG. 3, have been shown as North pole 46 and South pole 48 for purposes of illustration. The arms 12a, 12b and yoke 12d, and connection portions 50, 52, all directly or indirectly connected to the poles 46, 48, form a magnetic circuit which cooperates with the poles 46, 48 as will be hereinafter more fully described. With the poles, as shown, a portion of the magnetic flux or field $B_a$ extends directly across the cylindrical opening 16 and, therefore, will be coupled to the rotor 18. However, a portion of that magnetic field will be by-passed or shunted around the cylindrical opening or rotor air space 16. This fringe flux or leakage magnetic field passing through the metal core is designated $B_m$, the fringe flux $B_m$ serving no useful purpose or function since it bypasses the rotor 18. For this reason, the reluctance to such fringe flux or leakage magnetic field should be maximized whenever possible. As mentioned in the Background of the Invention with respect to U.S. Pat. No. 4,482,832, it is common practice to provide connecting portions 50, 52 which have the smallest possible cross-sectional areas for bridging the opposing poles. Such small cross-sectional areas are typically minimized by providing recesses or notches 54, 56. The smaller the cross-sectional areas of the bridging portions 50, 52, the higher the reluctance to the fringe or leakage magnetic fields $B_m$. This, in turn, increases and maximizes the intensity of the direct fields $B_a$ bridging the cylindrical opening 16 and, therefore, linking with rotor 18.

Figure 4:
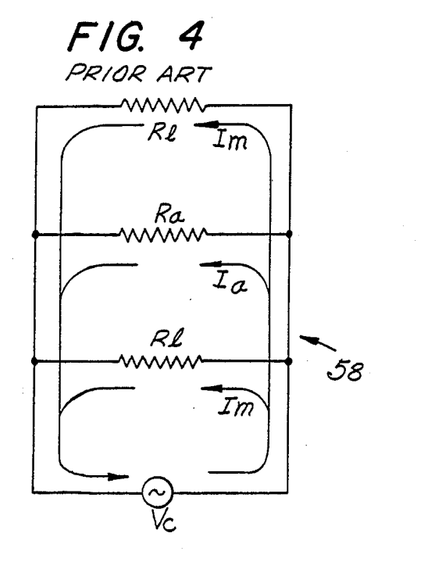
FIG. 4 is an equivalent magnetic circuit of a prior art motor similar to the one shown in FIGS. 1-3 suggesting the division of magnetic flux in a conventional motor which does not include auxiliary or secondary rotor encircling coil windings over the rotor air gap or space.

FIG. 4 is an equivalent electrical circuit 58 corresponding to the magnetic circuit of an electric motor in accordance with the prior art of the type disclosed in U.S. Pat. No. 4,482,832, or the motor 10 shown in FIGS. 1-3 absent the secondary or auxiliary rotor encircling coils 24a, 24b. The circuit 58 is a parallel circuit of resistor $R_a$ and two resistors $R_1$. The source $V_c$ represents the flux produced by the yoke winding 22 that flows in the magnetic circuit, which includes the stator core 12 and the rotor 18. The useful flux is represented by the current $I_a$ which corresponds to the flux $B_a$ in FIG. 3 which crosses the rotor air space 16 and couples to the rotor 18. However, currents $I_m$, part of the total current $I_T$ is shunted or bypassed through the low reluctance paths represented by the resistors $R_1$. The low reluctance paths in FIG. 3, for example, are the metallic portions 50 of reduced cross-sectional areas which connect or bridge the North and South poles 46, 48. The currents $I_m$ correspond, therefore, to the leakage or fringe flux fields $B_m$ in FIG. 3. As should be clear, the only flux which is effective or serves a useful function is the flux $B_a$ (corresponding to the current $I_a$). Thus, as in a parallel resistor circuit wherein the magnitude of a current in one resistor is reduced by shunting resistors, the leakage or fringe flux $B_m$ in FIG. 3 (equivalent to the shunted currents $I_m$) reduces the intensity of the primary flux field $B_a$ and, therefore, cause a deterioration of the operating parameters or characteristics of the motor.

Figure 5:
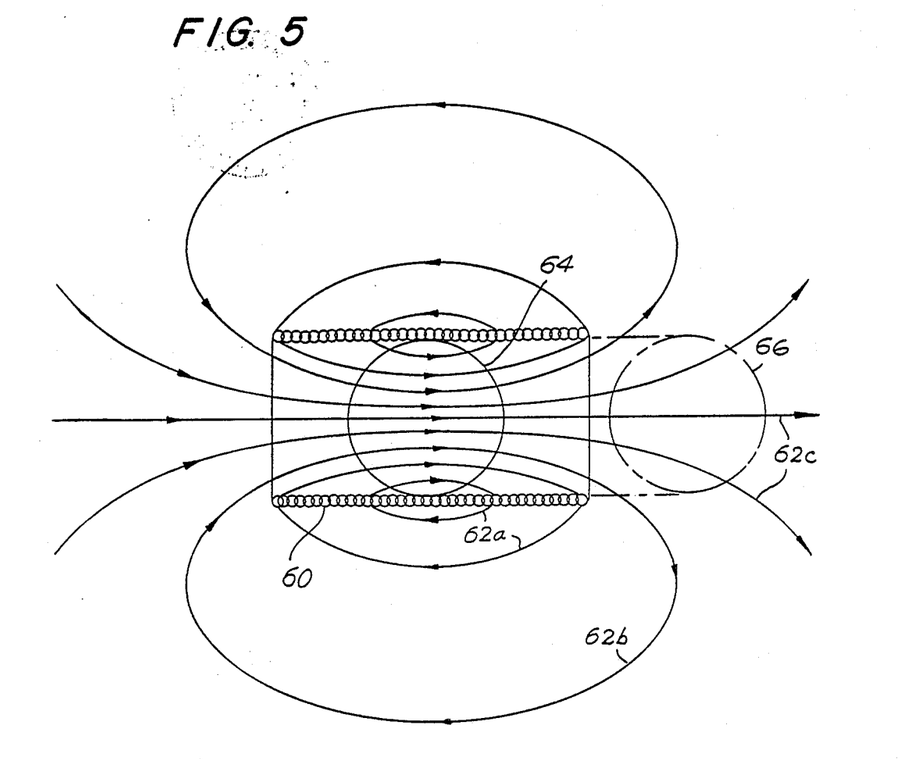
FIG. 5 is a schematic representation of a typical magnetic field created by a current flow through a coil, and the extent to which flux passes through an object positioned inside the coil (solid line) compared to the flux extending through an object along the axis of but outside the coil (dashed outline)

Referring to FIG. 5, there is shown a cross-sectional representation of a helical coil 60 through which a current is passed to create a magnetic field. The magnetic field created by such a coil is well known to those skilled in the art and includes lines of magnetic flux 62a-62c. As will be noted, while all of the lines of flux or magnetic field 62a-62c pass through the axially central portion of the coil, such lines increasingly diverge as the lines come closer to the axial ends of the coil. A cylindrical shape 64, representing a rotor, placed in the axially central portion of the coil, is shown to be coupled to all or most of the lines of magnetic field. However, when the same shaped and sized object 66, shown in dashed outline, is moved beyond the axial end of the coil 60, only some of the stronger magnetic field lines 62c still extend through the object. The remaining lines of magnetic field 62a and 62b bypass the object. The principle illustrated in FIG. 5 has been employed in the arrangement shown in FIGS. 1-3, wherein the secondary or auxiliary rotor encircling coils 24a, 24b are arranged over the cylindrical opening 16 and, therefore, overlap or enclose the rotor 18. Because of the configuration of the magnetic field, as shown in FIG. 5, all or most of the magnetic field created by the auxiliary rotor encircling coils 24a, 24b will, therefore, extend through the rotor 18 in the manner that the lines of magnetic field pass through the circular object 64 in FIG. 5.

Figure 6:
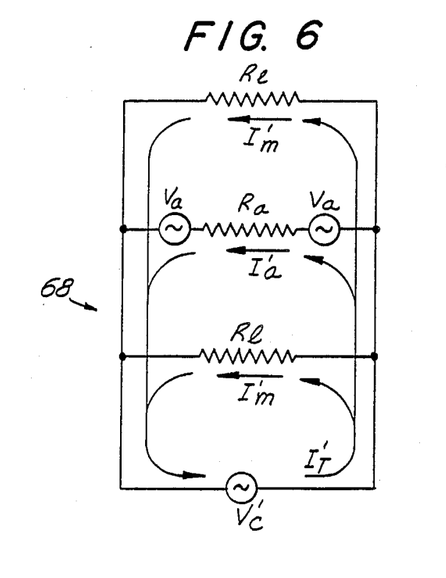
FIG. 6 is an equivalent magnetic circuit of the motor as shown in FIGS. 1-3, showing the effect of each of the three coils in the magnetic circuit.

The electrical analog or equivalent circuit of the motor 10 shown in FIGS. 1-3 with the two auxiliary rotor encircling coils 24a, 24b is the circuit 68 in FIG. 6. The two voltage sources $V_a$ correspond to each of the secondary or auxiliary rotor encircling coils 24a. It will be noted that each of these voltages $V_a$ are directly in series with $R_a$ which corresponds to the cylindrical opening 16. Since all of the lines of magnetic field produced by the auxiliary rotor encircling coils 24a, 24b will pass through the cylindrical opening 16 and the rotor 18, as suggested, in FIG. 5, this corresponds to the entire current $I_a'$ passing through the voltages $V_a$ passing through the resistor $R_a$. If the same number of total turns are to be maintained in the motor, there will be a channeling of the magnetic field into the cylindrical opening 16. If the number of turns in the yoke winding 22 is reduced to accommodate the auxiliary rotor encircling coils 24a, 24b in the rectangular opening or space 20, the voltage $V_c'$ in FIG. 6 will be less than the voltage $V_c$ in FIG. 4. While the currents $I_m'$ passing through the resistors $R_1$ are smaller, the total current $I_a'$ passing through the resistor $R_a$ is larger because that resistor is now in series with the two voltage sources $V_a$. Similarly, the total or overall flux passing through the cylindrical opening 16 and the rotor 18 will increase over the prior art construction which only utilized a yoke winding 22. The total current $I_T'$ may remain the same or change slightly, but this will not adversely affect the improved characteristics of the motor.

Figure 7:
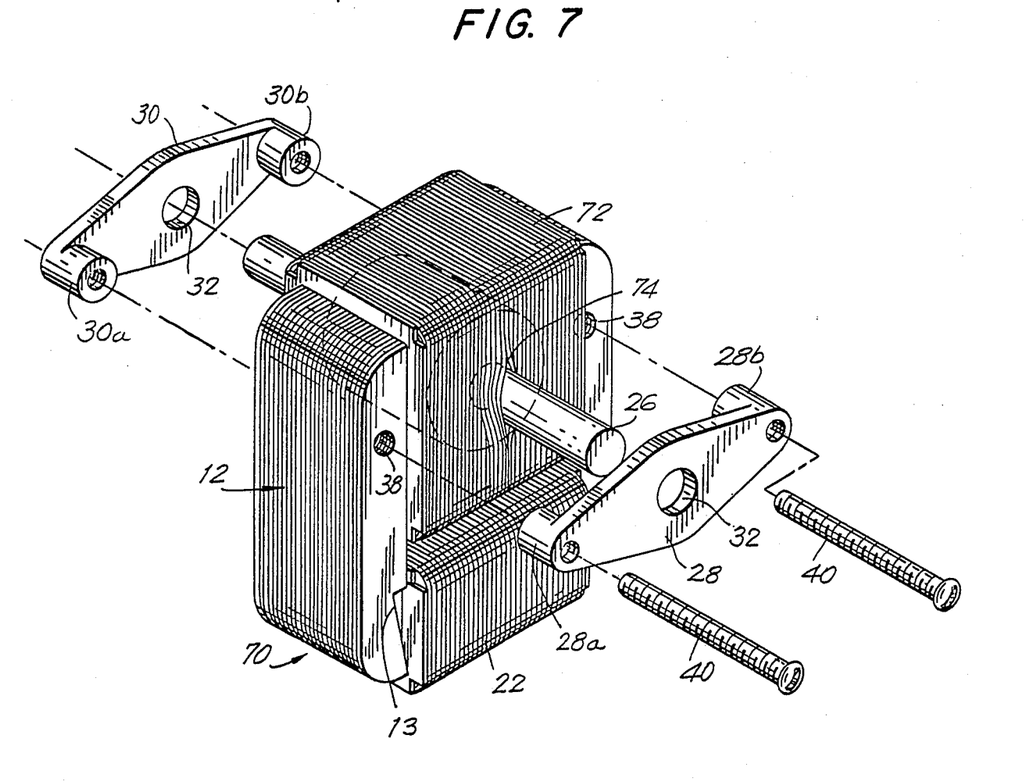
FIG. 7 is similar to FIG. 1, but showing an alternate embodiment wherein a single auxiliary or secondary rotor encircling coil is used in place of the two separate coils as shown in FIG. 1.
Figure 8:
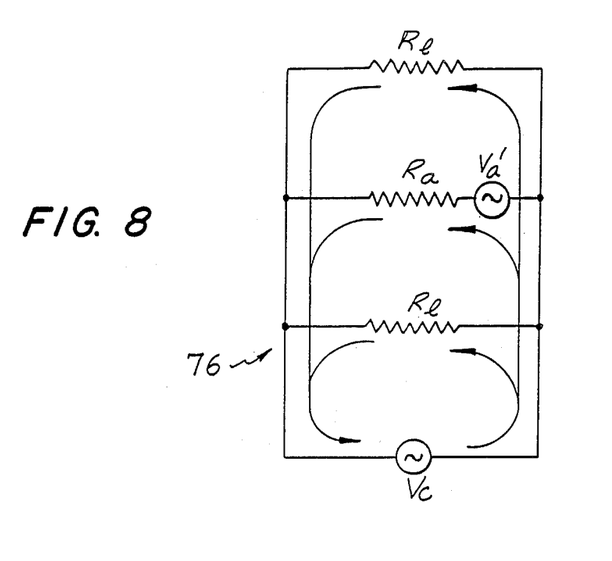
FIG. 8 an equivalent magnetic circuit of the motor shown in FIG. 7, showing the effect of each of the two coils.

Referring to FIG. 7, another embodiment 70 of the invention is shown wherein only a single auxiliary rotor encircling coil or winding 72 is provided over the rotor space or air gap which encloses the rotor. In this embodiment, the turns of the coil 72 are wound on a rigid form extending on both sides of the shaft 26 with a separation or spacing 74 being provided between the turns to accommodate the shaft. In FIG. 8, the equivalent magnetic circuit 76 is shown for the motor 70 shown in FIG. 7. Here, only a single voltage source $V_a'$ is shown representing the entire coil on both sides of the shaft 26. If the number of turns are the same in the single coil 72 as the combined number of turns in windings in the auxiliary coils 24, 24a, 24b, the value of the souce $V_a'$ should be approximately twice the value of the souce $V_a$ in FIG. 6. The improvement and operation of the motor shown in FIG. 7 over the prior art motors is substantially the same as that discussed in connection with the motor 10 in FIGS. 1–3.

While each of the motors 10 and 70 include a primary or yoke winding 22, it should be clear that the present invention can also achieve many of its objects and advantages by simply utilizing the secondary or auxiliary rotor encircling coils 24, 24a, 24b and 72. If the yoke windings are eliminated, the voltages $V_c$ and $V_c'$ in the equivalent circuits shown in FIGS. 6 and 8 would be eliminated. While the cylindrical opening 16 and the rotor 18 would be deprived of a flux contribution from yoke windings 22, the secondary or auxiliary rotor encircling windings 24a, 24b and 72 could be enlarged since yoke winding would no longer occupy space in the rectangular space 20 and this would compensate for the absence of the yoke windings. In that event, the equivalent voltages $V_a$ and $V_a'$ will increase and all of the current passing therethrough would pass through the resistors $R_a$ which represent the cylindrical opening 16 and rotors 18.

Figure 9:
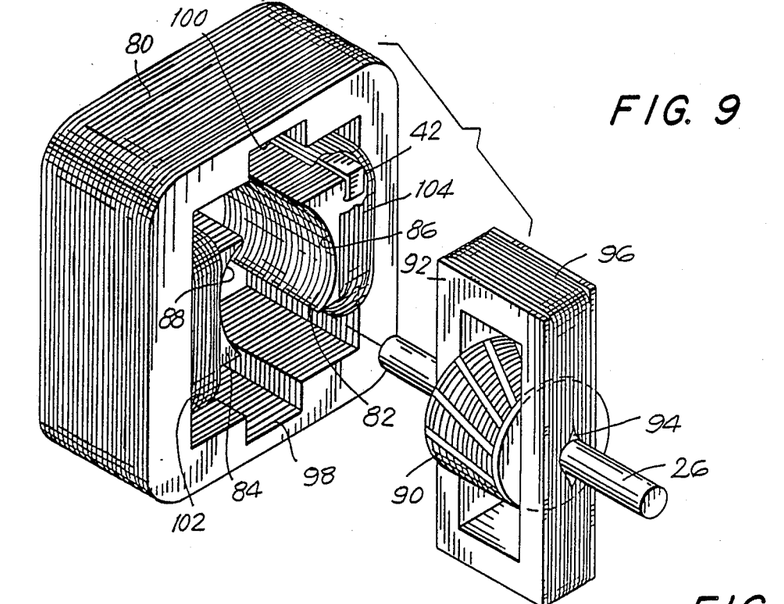
FIG. 9 is a still further embodiment of the present invention, wherein the secondary rotor encircling coil is wound on a rigid form which is placed between opposing poles and rotatably supports the rotor.
Figures 10, 11, 12:
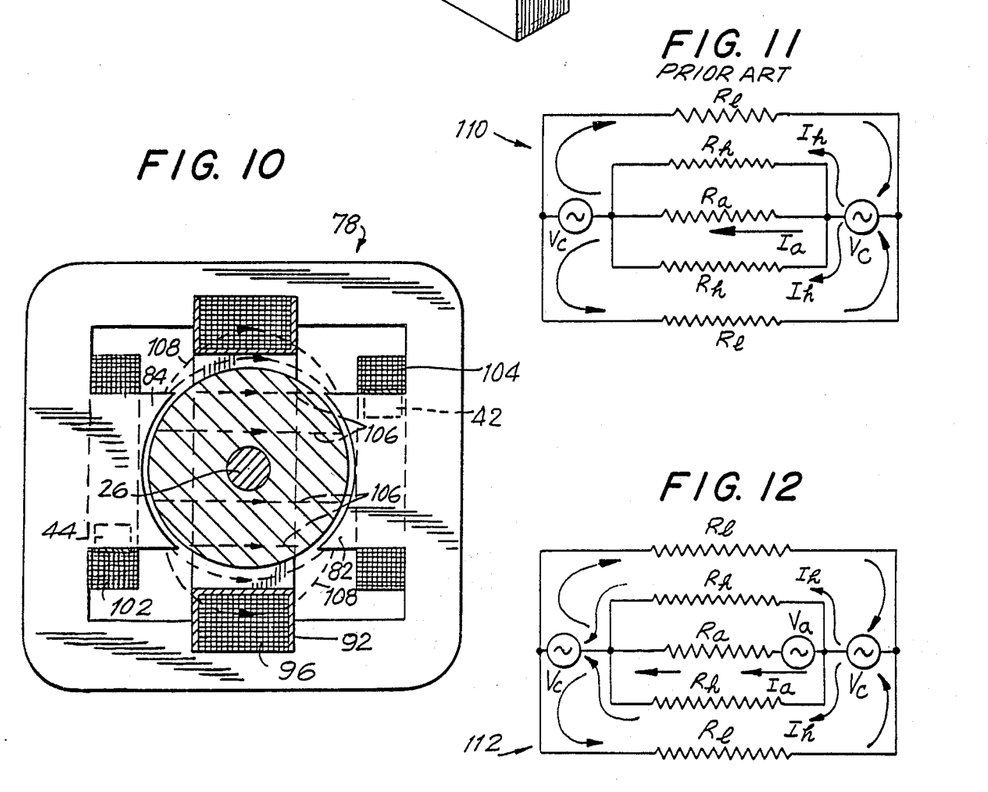
FIG. 10 is an enlarged front elevational view, partially in cross-section, of the motor shown in FIG. 9.
FIG. 11 is an equivalent magnetic circuit of a prior art construction of a motor similar to the one shown in FIG. 9, without the secondary or auxiliary rotor encircling coil.
FIG. 12 is similar to FIG. 11, but showing the effect of the additional coil in the magnetic circuit of FIG. 11.

Referring to FIGS. 9 and 10, a still further embodiment of the motor is illustrated and identified by the reference numeral 78. The motor 78 includes a core 80 which is generally rectangular in shape and has two pairs of orthogonal legs, each pair including two spaced substantially parallel legs, one pair of these legs supporting opposing poles 82, 84 having curved surfaces 86, 88 configurated to receive a rotor 90 (shown as squirrel cage rotor) with small tolerance or air gap therebetween. The core 80 is similar to the core 12 discussed in connection with FIGS. 1–3 and 7 except that the laminations are continuous square sections and do not include a removable yoke 12d. In essence, the core 80 consists of two opposing poles 82, 84 which are connected by permanently connected or integral upper and lower yokes which form two essentially parallel magnetic circuits above and below the poles.

A support structure 92 is provided for rotatably supporting the shaft 26 and the rotor 90. The supporting structure 92 is shown to be a rectangular member having a generally U-shaped cross-section for receiving the windings or turns of the auxiliary rotor encircling coil, and being dimensioned to be frictionally received within lower and upper grooves or recesses 98, 100. Once the support structure 92 is press fitted within the slots 98, 100, the rotor 90 is centrally positioned between the poles 82, 84 and received within the auxiliary rotor encircling winding 96 to produce the effect shown in FIG. 5.

In the prior art constructions of motors similar to the motor 78, shown in FIGS. 9 and 10, coils 102 and 104 are provided on each of the poles 82, 84. However, these conventional coils are axially spaced from the rotor and there will, therefore, be lower and higher paths of magnetic reluctance for the field. Referring to FIG. 10, the magnetic field lines 106 are shown to extend from one pole to the opposite pole through the rotor space or air gap itself. This is the useful flux which couples to the rotor. However, because of the shape of the poles 82, 84, the portions of the poles which are the closest to each other are also those portions which are the furthest from the axis of the rotor. While a considerable amount of the magnetic field lines 106 will pass through and therefore couple to the rotor, a significant portion of the field lines 108 will bypass the rotor space or air gap.

In FIG. 11, an equivalent circuit 110 is shown which represents the magnetic circuit of a motor of the type shown in FIGS. 9 and 10, without the secondary or auxiliary rotor encircling winding 96. Here, the voltages $V_c$ correspond to the conventional pole windings 102, 104. The resistors $R_1$ represent the yokes connecting the poles, while the resistors $R_h$ represent the leakage flux which bypasses the rotor space or air gap. The currents developed by the voltage sources $V_c$ are divided or split between effective current a (corresponding to field passing through the rotor air space) and leakage currents $I_h$ (corresponding to leakage or fringe flux fields).

When the auxiliary rotor encircling winding 96 is incorporated, FIG. 12 shows the addition of a new voltage source $V_a$ which, again, is in series with the resistor $R_a$ which represents the effective or functional field passing through the rotor space or air gap. The total field circuit $I_a'$ flowing through the resistor $R_a$ in circuit 112 is now the composite or the sum of the initial current $I_a$ and the current produced by the additional sources $V_a$.

Figure 13:
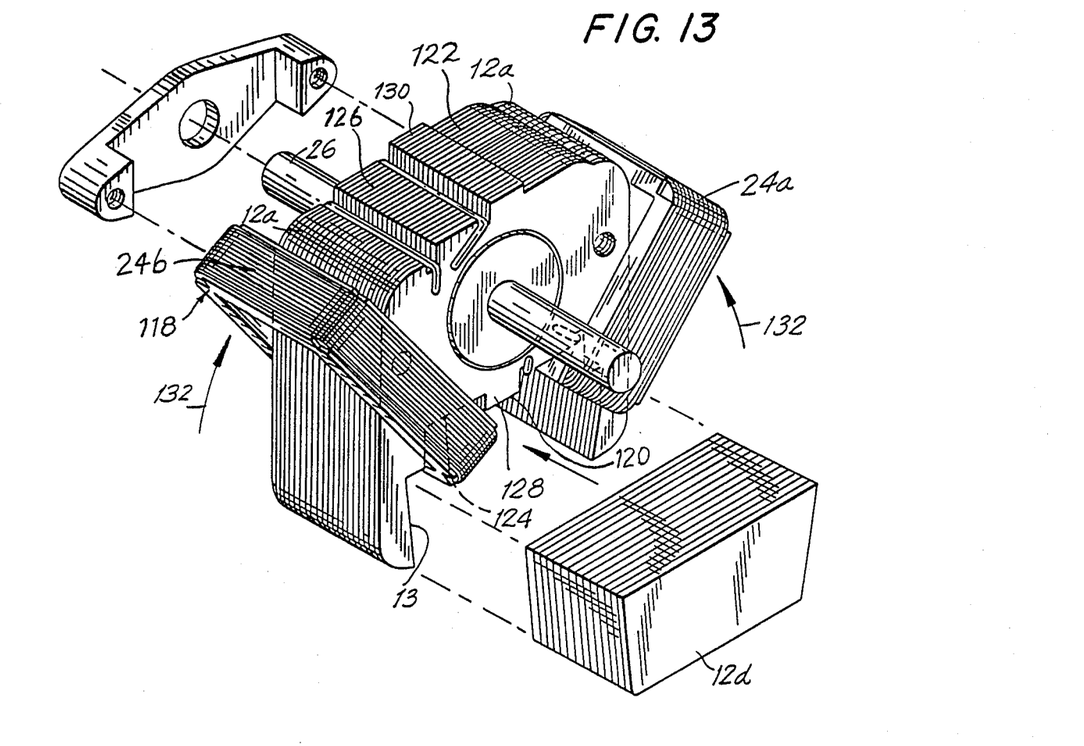
FIG. 13 is similar to FIG. 1, showing the manner in which the secondary or auxiliary rotor encircling coil forms may be mounted on the stator core.
Figure 14:
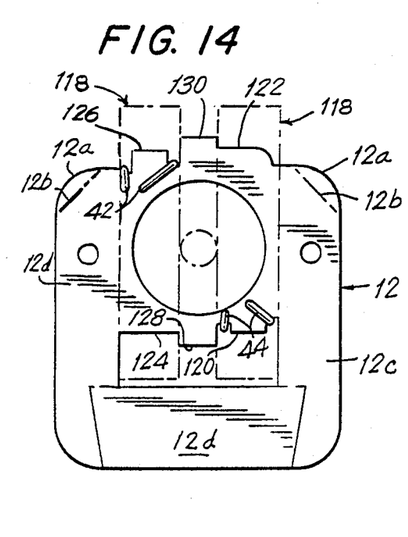
FIG. 14 shows the details of the geometry of the laminations forming the stator core shown in FIG. 13 which facilitates and makes possible the mounting of the secondary or auxiliary rotor encircling coils.
Figure 15:
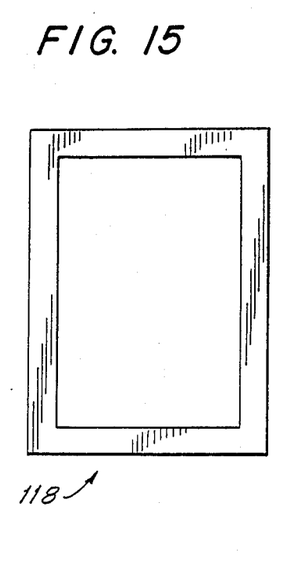
FIG. 15 is a front elevational view of a form suitable for receiving the wire which comprises the secondary or auxiliary rotor encircling coils shown in FIG. 13.
Figure 16:
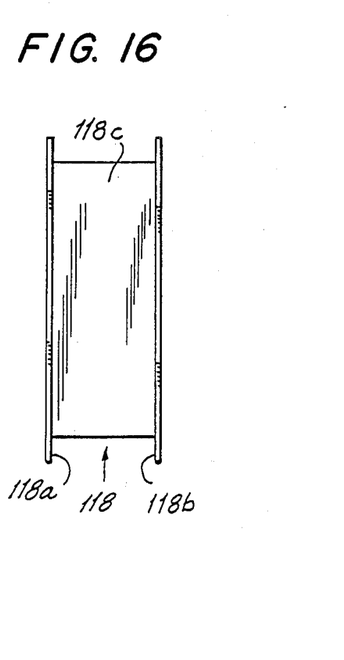
FIG. 16 is a side elevational view of the coil form shown in FIG. 15.

Referring to FIGS. 13 and 14, there is illustrated a geometrical configuration of the laminations which facilitates the mounting of the auxiliary rotor encircling windings 24a, 24b when wound on forms 118 shown in FIGS. 15 and 16. The forms 118 include lateral flanges 118a, 118b connected to a flat rectangular form 118c to form a bobbin or spool. The windings or turns are wound on the form 118 as shown, for example, in FIG. 13.

The laminations are provided with surfaces 120, 122, on one side of the rotor axis and surfaces 124, 126 on the other side of the rotor axis, which associated surfaces being spaced from each other to substantially correspond to the inside dimension of the form 118 so that the form 118 frictionally engages the associated surfaces of the stator core as suggested by the dashed outlines in FIG. 14. Extension or protruberance 128 extends below the surfaces 120, 124 and the protruberance 130 extends above the surfaces 122, 126, as viewed in FIG. 14, and serve as spacers for the forms 118 to limit their radially inward movements to thereby avoid contact or abutment against the rotating shaft 26.

Advantageously, the corner surfaces 12a are curved to allow the forms to clear the stator core during mounting. To insure easier clearance, the corners 12a may be somewhat flattened as suggested by the dashed outlines 12b to increase the clearances and simplify assembly.

As will be noted, appropriate cutouts are provided proximate to the surfaces 120, 126 to permit the mounting of the shading coils 42, 44 below the surfaces 120, 126 to avoid interference with the mounting of the auxiliary or secondary rotor encircling coils 24a, 24b.

The method for mounting the auxiliary rotor encircling coils 24a, 24b is suggested in FIG. 13. Before the yoke 12d is mounted the rotor encircling coils 24a, 24b are slipped over the side portions or arms 12a, 12b as shown in FIG. 13. Once the lower portions of the coils have engaged the surfaces 120, 124 of the stator core, the turns are rotated as suggested by the arrows 132 until the upper portions of the coils engage and abut against the upper protruberance 130 of the stator core. Once the auxiliary rotor encircling coils are set in place, the yoke 12d, with or without a primary or yoke winding 22 is mounted by press fitting the yoke between the arms 12a, 12b (e.g. dove tail construction) to complete the magnetic circuit.

While the principle of operation of the invention has been described, together with the presently preferred embodiments for practicing the invention, it will be evident to those skilled in the art that various modifications or changes can be made while still achieving the advantages of the invention. Thus, for example, the rotor encircling coils may be connected in series or in parallel with each other and/or with the conventional yoke windings as long as the polarity or the sense of the windings are such that the magnetic fields or flux lines reinforce each other instead of opposing or cancelling each other. Additionally, while all of the embodiments have been described in relationship to motors having shaded poles, the rotor encircling coils in accordance with the invention can also be used in connection with any two pole electrodyanamic machine including, but not limited to single and multiple phase machines, capacitor start motors and motors which use commutators.

A range of modifications and changes to the preferred embodiments described above will be apparent to those skilled in the art. For example, it is possible to use a single rotor encircling auxiliary coil, such as coil 24a or 24b. This would produce only a single voltage source $V_a$ in FIG. 6. Additionally, it is possible to utilize only auxiliary rotor encircling coils and, as suggested above, to do away totally with the yoke winding 22. This will, as suggested, normally result in higher voltage sources $V_a$ while eliminating the voltage sources $V_c$ in the equivalent circuits.

Additionally, while the invention has been described in the context of a fractional horse power AC shaded pole electric motor, it will become apparent to those skilled in the art that the same principle and invention can be utilized in any two pole motor which relies upon induction of magnetic field from the stator poles to the rotor between the poles. It is possible, therefore, to also utilize the invention in other forms of induction motors.

It is, therefore, intended that the foregoing detailed description be regarded as illustrative rather than limiting, and that it be understood that it is the claims, including all equivalents, which are intended to define the scope of this invention.

What is claimed is:

1. An AC induction electric motor comprising a rotor; a stator including a stator core having spaced opposing poles which generally define an air gap therebetween for receiving said rotor rotatably mounted on said stator, and having magnetic circuit means connected to said poles for providing a low reluctance return magnetic circuit both for the effective magnetic field crossing said air gap and passing through said rotor as well as leakage magnetic field which by-passes said rotor; and at least one stator rotor encircling winding at least partially overlapping said air gap and at least partially receiving a portion of said rotor, whereby substantially the entire magnetic field created by said at least stator one rotor encircling winding is forced to pass through said rotor with minimal leakage magnetic field bypassing said rotor, and the effectiveness of said at least one stator rotor encircling winding is optimized.

2. A motor as defined in claim 1, further comprising at least one stator yoke winding arranged on said stator core spaced from said air gap to produce a magnetic field which reinforces the magnetic field produced by said at least one stator rotor encircling winding through said rotor and said magnetic circuit means.

3. A motor as defined in claim 1, wherein one stator yoke winding is arranged to at least partially receive at least one of said poles.

4. A motor as defined in claim 1, wherein two stator yoke windings are arranged each to at least partially receive another one of said poles.

5. A motor as defined in claim 2, wherein said stator yoke winding is provided on said magnetic circuit means.

6. A motor as defined in claim 1, wherein said rotor is mounted on a shaft, and two stator rotor encircling windings are provided one on each side of said shaft.

7. A motor as defined in claim 1, wherein said rotor is mounted on a shaft, and one stator rotor encircling winding is provided having turns on both sides of said shaft with a separation or spacing being provided between said turns to accommodate said shaft.

8. A motor as defined in claim 1, wherein said core is generally rectangular in shape and has to pairs of orthogonal legs, each pair of legs including two spaced substantially parallel legs, one pair of said legs supporting said poles; and further comprising rotor supporting means being removably connected to the other pair of said legs, said rotor supporting means having said rotor rotatably mounted thereon and supporting said at least one stator rotor encircling winding.

9. A motor as defined in claim 8, wherein said other pair of said legs each have an axial groove, said rotor supporting means comprising a form for receiving said at least one rotor encircling winding.

10. A motor as defined in claim 8, wherein said rotor supporting means has dimensions to be frictionally received and retained within said axial grooves.

11. A motor as defined in claim 8, wherein said rotor supporting means has a U-shaped cross-section.

12. A motor as defined in claim 1, wherein said magnetic circuit means includes a removable yoke section, and further comprising at least one wire receiving form for receiving said at least one stator rotor encircling winding, said stator core being provided with spacer means and being configured to permit positioning and mounting of said at least one wire receiving form and rotor encircling winding in the absence of said removable yoke section prior to re-attachment of said removable yoke section, whereby mounting of said at least one stator rotor encircling winding is facilitated.

13. A motor as defined in claim 12, wherein the rotor as a shaft and wherein spacer means are provided on each side of said rotor shaft, whereby two stator rotor encircling windings can be mounted and secured on said stator core to each side of said rotor shaft.

14. A motor as defined in claim 12, wherein said spacer means comprises protuberances extending from said stator core.

15. A motor as defined in claim 12, wherein said stator core is provided with curved surfaces to reduce linear dimensions of critical maximum cross-sectional areas to permit mounting of said rotor encircling windings on said stator core without deformation to said wire receiving forms.

16. A motor as defined in claim 1, wherein said rotor is mounted on a shaft, and further comprising retainer means attached to said stator core and rotatably supporting said shaft.

17. A motor as defined in claim 16, wherein said retainer means includes standoff means for providing a clearance between said stator core and said retainer means for accommodating said at least one rotor encircling winding.

18. A motor as defined in claim 2, wherein said at least one rotor encircling winding and said at least one stator yoke winding are electrically connected in series with each other.

19. A motor as defined in claim 2, wherein said at least one stator rotor encircling winding and said at least one stator yoke winding are electrically connected in parallel with each other.

20. A motor as defined in claim 1, wherein the motor is a shaded pole motor.

21. A motor as defined in claim 1, wherein said rotor is a squirrel cage rotor.

22. A motor as defined in claim 1, wherein said core has one pair of opposing poles.

* * * * *

UNITED STATES PATENT AND TRADEMARK OFFICE
CERTIFICATE OF CORRECTION

PATENT NO. : 4,942,323
DATED      : July 17, 1990
INVENTOR(S): De Cesare, Dominic It is certified that error appears in the above-identified patent and that said Letters Patent is hereby corrected as shown below:

Column 4, Line 50    Change "coil" to --coils--;

Column 5, Line 46    Change "rotor air space" to --cylindrical opening--.

Signed and Sealed this

Seventh Day of April, 1992

Attest:

HARRY F. MANBECK, JR.

*Attesting Officer*    *Commissioner of Patents and Trademarks*